US008964897B2

(12) United States Patent
Tomita et al.

(10) Patent No.: US 8,964,897 B2
(45) Date of Patent: Feb. 24, 2015

(54) TRANSMITTING DEVICE AND TRANSMITTING METHOD

(75) Inventors: Yosuke Tomita, Kasugai (JP); Hidemitsu Kawashima, Seto (JP); Takashi Yamada, Kasugai (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 334 days.

(21) Appl. No.: 13/421,334

(22) Filed: Mar. 15, 2012

(65) Prior Publication Data

US 2012/0236957 A1 Sep. 20, 2012

(30) Foreign Application Priority Data

Mar. 15, 2011 (JP) .................................. 2011-057213
Sep. 12, 2011 (JP) .................................. 2011-198066

(51) Int. Cl.
*H04L 27/12* (2006.01)

(52) U.S. Cl.
CPC ....................................... *H04L 27/12* (2013.01)
USPC .......................................................... 375/303

(58) Field of Classification Search
CPC .......... H04L 27/10; H04L 27/06; H04L 27/12
USPC .......................................... 375/303, 304, 295
See application file for complete search history.

(56) References Cited

U.S. PATENT DOCUMENTS

| 4,223,405 A * | 9/1980 | Hattori et al. ................. 455/105 |
| 7,508,276 B2 | 3/2009 | Beyer et al. |
| 2002/0044595 A1 | 4/2002 | Friedrich |
| 2005/0094718 A1 * | 5/2005 | Pasternak et al. ............. 375/219 |
| 2007/0080779 A1 * | 4/2007 | Tang et al. ................... 340/5.61 |
| 2007/0252654 A1 | 11/2007 | Beyer et al. |
| 2008/0088409 A1 | 4/2008 | Okada et al. |
| 2008/0227389 A1 | 9/2008 | Sakata et al. |

FOREIGN PATENT DOCUMENTS

| CN | 1315101 A | 9/2001 |
| DE | 10 2006 017 973 A1 | 10/2007 |
| JP | 2000-286986 A | 10/2000 |
| JP | 2008-101344 A | 5/2008 |
| JP | 2008-227686 A | 9/2008 |

OTHER PUBLICATIONS

Office Action for German Application No. 10 2012 101 328.4 dated Nov. 15, 2012, with English translation thereof (8 pages).
Office Action issued in counterpart Japanese Patent Application No. 2011-198066 dated Feb. 17, 2014 (12 pages).
Office Action issued in corresponding Chinese application No. 201210067204.8, mailed Feb. 8, 2014 (17 pages).

* cited by examiner

*Primary Examiner* — Kevin M Burd
(74) *Attorney, Agent, or Firm* — Osha Liang LLP (57) ABSTRACT

A transmitting device that transmits a FSK-modulated wireless signal to a receiving device includes a controller that determines a transmitting content transmitted to the receiving device and a value of a maximum frequency shift in the FSK modulation, and outputs output information including the transmitting content, the value of the maximum frequency shift, and a value of a center frequency in the FSK modulation; a generator that generates a FSK modulation signal based on the transmitting content, the value of the maximum frequency shift, and the value of the center frequency, which are output from the controller; and a transmitting antenna that transmits the FSK modulation signal, which is generated by the generator, in a form of a wireless signal.

5 Claims, 9 Drawing Sheets

TRANSMITTING DEVICE AND TRANSMITTING METHOD

BACKGROUND OF THE INVENTION

1. Technical Field

The present invention relates to a transmitting device and a transmitting method, particularly to a transmitting device and a transmitting method, which conduct FSK-modulated wireless communication with a receiving device.

2. Related Art

A fob key (FOB) that is used in a keyless entry system of a vehicle transmits a command signal such as lock/unlock to a vehicle-side ECU when a user pushes a push button switch such as lock/unlock of the FOB. The vehicle-side ECU actually performs the lock/unlock of a vehicle door when the command signal is authenticated as a signal transmitted from the previously-registered FOB.

Because communication between the FOB and the vehicle-side ECU is wirelessly conducted, sometimes the communication is interrupted by turbulence or the like (noise). It is conceivable that increasing output intensity of the signal in order to prevent the communication interruption caused by the turbulence or the like. However, in the keyless entry system, an upper limit of the output intensity of the wireless communication used by the FOB is stipulated by a law, and the signal cannot be transmitted at the output intensity exceeding the upper limit. Therefore, in order to prevent the interruption caused by the turbulence or the like, there is well known a method, in which a frequency of the signal transmitted from the FOB to the vehicle-side ECU is changed to conduct communication at a frequency at which the turbulence or the like has a little influence.

For example, Japanese Unexamined Patent Publication No. 2008-101344 discloses a vehicle control system that securely conducts communication in the keyless entry system. In the vehicle control system of Japanese Unexamined Patent Publication No. 2008-101344, a smart fob key (FOB) transmits a keyless wireless signal for the keyless entry system in two frequency channels. On the other hand, an integrated tuner that receives the keyless wireless signal determines the frequency channel having a better communication state in the two frequency channels, and controls the keyless wireless signal of the determined frequency channel so as to convert the keyless wireless signal into an intermediate frequency signal. As a result, the keyless wireless signal of the frequency channel having the better communication state is received to securely conduct communication.

In the vehicle control system of Japanese Unexamined Patent Publication No. 2008-101344, it is necessary to use a plurality of frequency channels, and it is necessary to provide a circuit that transmits and receives the plural frequencies in not only the transmitting device side (FOB) but also the receiving device (vehicle-side ECU).

SUMMARY

One or more embodiments of the present invention provide a transmitting device, which conducts wireless communication with a receiving device in the keyless entry system and can prevent an interruption caused by turbulence or the like in the wireless communication to securely conduct communication with the receiving device using the single frequency channel.

In accordance with an aspect of one or more embodiments of the present invention, a transmitting device that transmits a FSK-modulated wireless signal to a receiving device, includes: a controller that determines a transmitting content transmitted to the receiving device and a value of a maximum frequency shift in the FSK modulation, and outputs output information including the transmitting content, the value of the maximum frequency shift, and a value of a center frequency in the FSK modulation; a generator that generates a FSK modulation signal based on the transmitting content, the value of the maximum frequency shift, and the value of the center frequency, which are output from the controller; and a transmitting antenna that transmits the FSK modulation signal, which is generated by the generator, in a form of a wireless signal, wherein the controller outputs a plurality of pieces of information each of which includes the identical transmitting content, the identical values of the center frequency, and two or more different values of the maximum frequency shifts at different times, when the identical transmitting content is transmitted to the receiving device.

Accordingly, the interruption caused by the turbulence or the like can be prevented in the wireless communication to securely conduct communication with the receiving device.

The controller may output the output information including the maximum frequency shifts having the alternately-different values, when the identical transmitting content is transmitted to the receiving device.

Accordingly, the transmitting device, in which the interruption caused by the turbulence or the like can be prevented in the wireless communication to securely conduct communication with the receiving device by a simple logic, can be provided.

The transmitting device may further include an amplifier, wherein the controller includes: a voltage detector that detects a supply voltage of a power supply; and a signal intensity determination unit that determines signal intensity of the FSK modulation signal based on a value of the supply voltage detected by the voltage detector, the controller outputs the output information further including the value of the signal intensity determined by the signal intensity determination unit, the generator sets the value of the signal intensity to the amplifier, and the transmitting antenna transmits the FSK modulation signal in the form of the wireless signal at the signal intensity set to the amplifier.

Accordingly, the transmitting device that outputs the signal having the constant intensity irrespective of the power supply voltage level can be provided.

In accordance with another aspect of one or more embodiments of the present invention, a transmitting method for transmitting a transmitting content in a form of a FSK-modulated wireless signal to a receiving device at least twice, includes the steps of: performing predetermined FSK modulation on the transmitting content to transmit the transmitting content based on a value of a center frequency in the FSK modulation and a value of one of maximum frequency shifts; and performing the predetermined FSK modulation on the transmitting content to transmit the transmitting content based on the value of the center frequency in the FSK modulation and a value of the other maximum frequency shift.

Accordingly, the transmitting method for preventing the interruption caused by the turbulence or the like in the wireless communication to securely conduct communication with the receiving device can be provided.

As described above, the transmitting device and the transmitting method, which conduct wireless communication with the receiving device and can prevent the interruption caused by the turbulence or the like in the wireless communication to securely conduct communication with the receiving device using the single frequency channel, can be provided according to one or more embodiments of the present invention.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
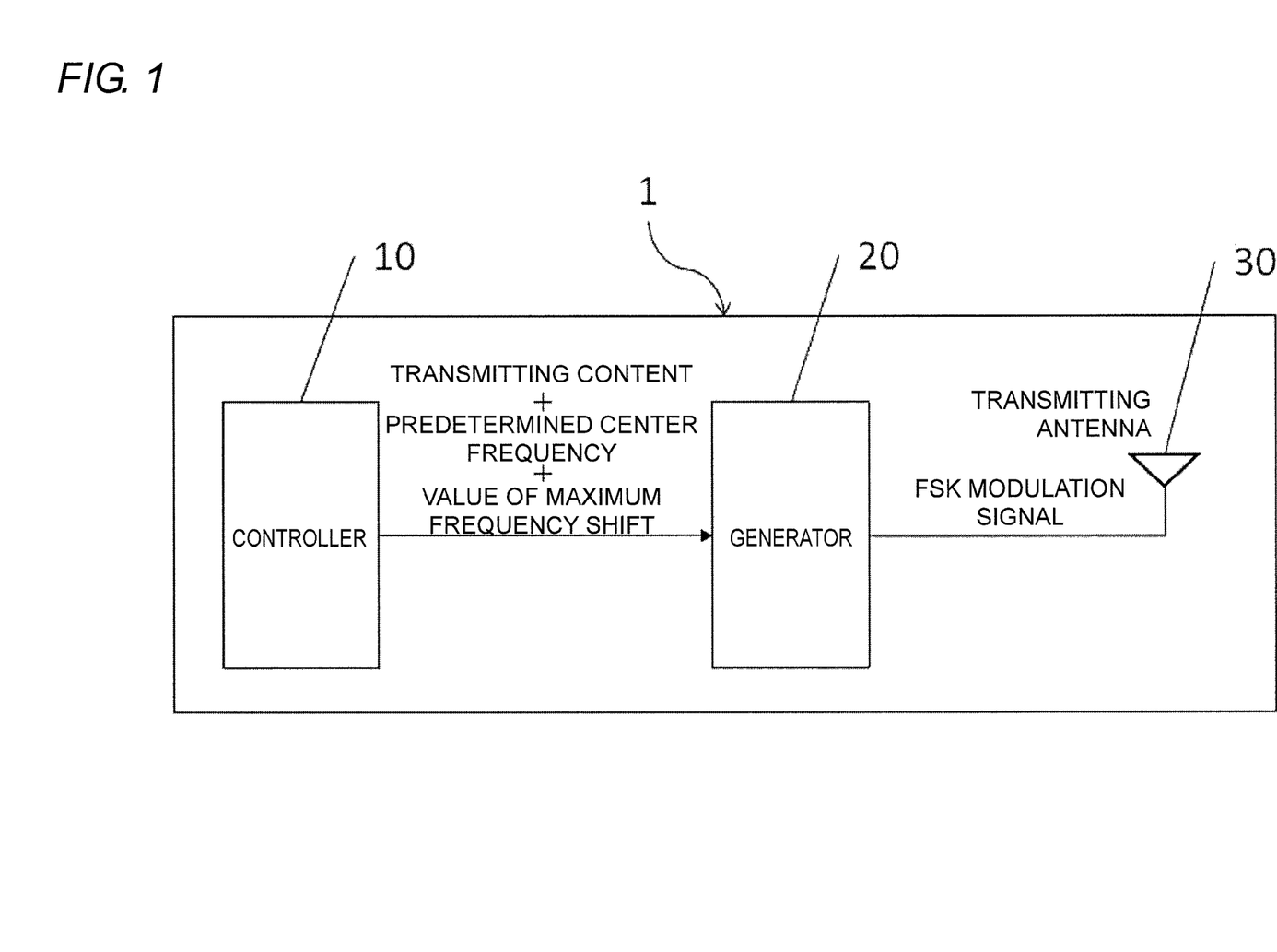
FIG. 1 is a block diagram illustrating a transmitting device according to a first embodiment of the present invention.

FIG. 1 is a block diagram illustrating a transmitting device 1 according to a first embodiment of the present invention. The transmitting device 1 conducts wireless communication with a vehicle-side receiving device (not illustrated) in a keyless entry system of a vehicle, and typically the transmitting device 1 is included in a fob key (FOB). Obviously, the transmitting device 1 according to one or more embodiments of the present invention can be applied to a keyless entry system for other than a vehicle.

The transmitting device 1 includes a controller 10, a generator 20, and a transmitting antenna 30. The controller 10 determines a transmitting content transmitted to the vehicle-side receiving device and a value of a maximum frequency shift in the FSK modulation. As used herein, the transmitting content includes information necessary to authenticate the FOB and a command signal such as lock/unlock which is provided from the FOB to the vehicle-side receiving device. The information necessary to authenticate the FOB is previously set in each FOB, and the command signal is determined by a user every time the FOB is used. The maximum frequency shift in the FSK modulation means a difference between frequencies indicating two values in the frequency shift keying. The maximum frequency shift will be described later.

The controller 10 outputs output information including the determined transmitting content, the determined value of the maximum frequency shift, and a value of a center frequency of the FSK modulation. The value of the center frequency of the FSK modulation means a value of an average (arithmetic average or geometric average) of the frequencies indicating two values in the FSK modulation. The center frequency is previously set in the keyless entry system.

The controller 10 outputs pieces of information each of which includes the identical transmitting content, the identical value of the center frequency, and the different value of the maximum frequency shift, when the one transmitting content is transmitted to the vehicle-side receiving device. In other words, for example, when transmitting the transmitting content of "door lock" at a certain time point, the controller 10 outputs the transmitting content plural times with the same value of the center frequency while the value of the maximum frequency shift is changed. How to change the value of the maximum frequency shift will be described later.

The generator 20 generates a FSK modulation signal based on the transmitting content, the value of the maximum frequency shift, and the value of the center frequency, which are output from the controller 10. A frequency in which a half value of the maximum frequency shift is added to the center frequency output from the controller 10 and a frequency in which the half value of the maximum frequency shift is subtracted from the center frequency output from the controller 10 are generated such that the vehicle-side receiving device can process the transmitting content while converting the transmitting content into a digital signal.

The transmitting antenna 30 transmits the FSK modulation signal, which is generated by the generator 20, in the form of the wireless signal. Generally, a coil antenna is used as the transmitting antenna of the FOB. However, there is no particular limitation to the transmitting antenna.

Figures 2A, 2B:
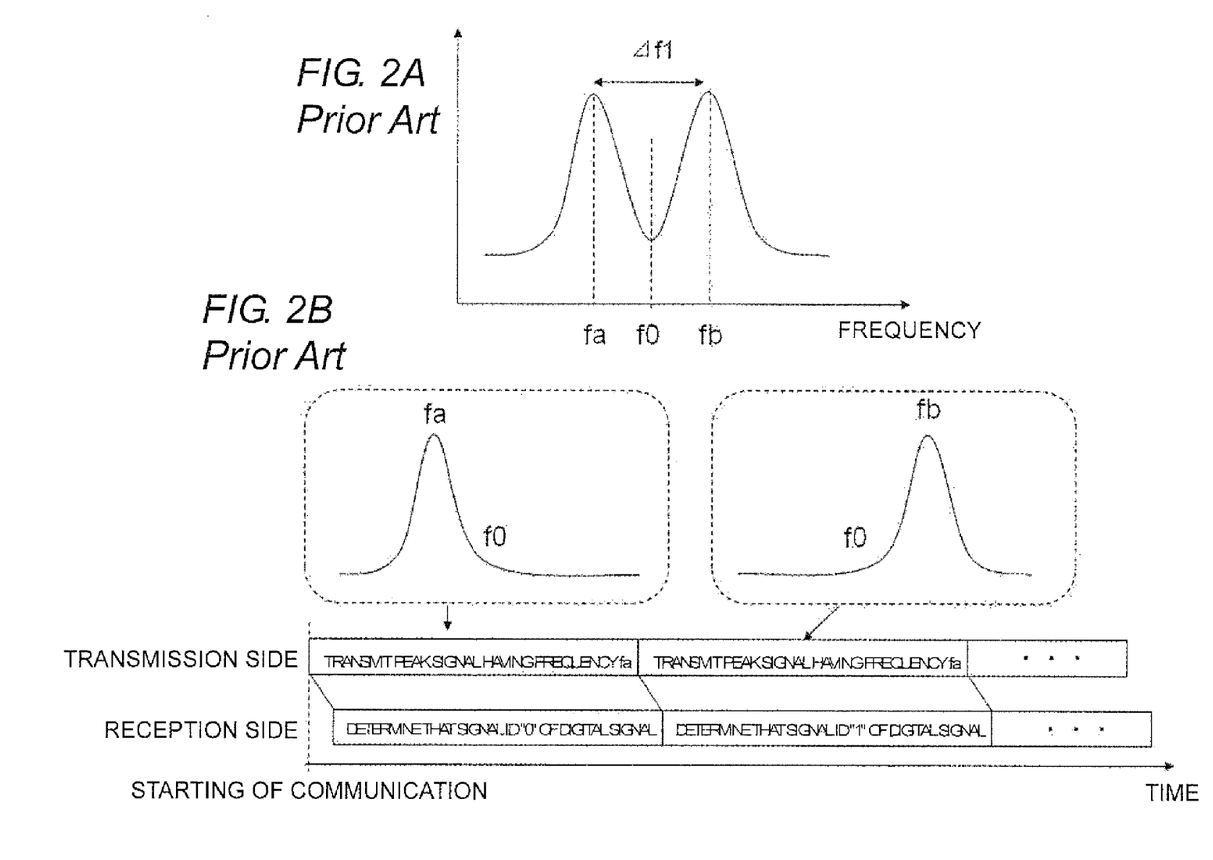
FIGS. 2A and 2B are explanatory views of a general transmitting method in communication of a FSK modulation system.
Figure 3A:
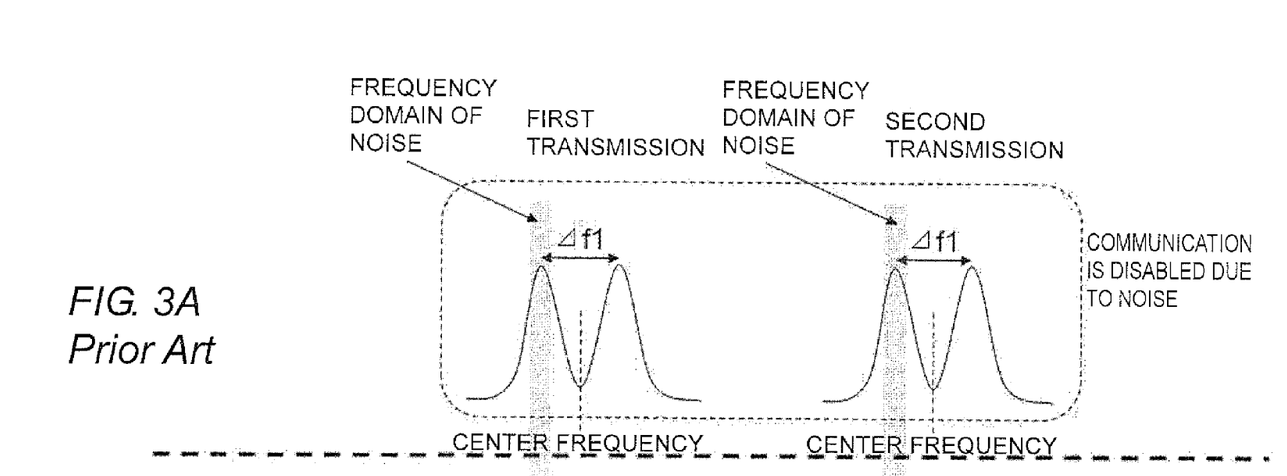
FIG. 3A is an explanatory view of a conventional transmitting method.
Figure 3B:
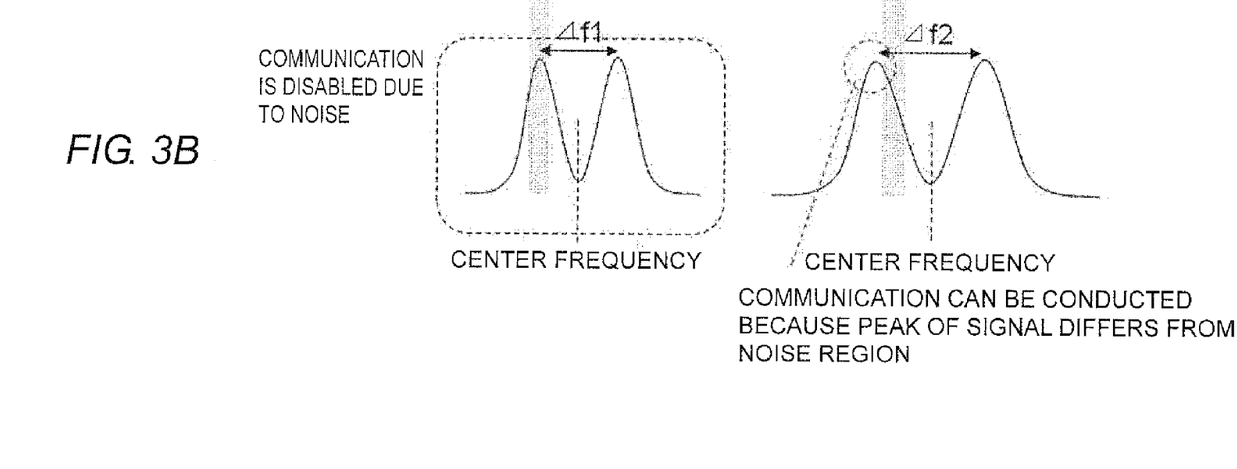
FIG. 3B is an explanatory view of a transmitting method in the transmitting device of the first embodiment of the present invention.

How to change the value of the maximum frequency shift will be described with reference to FIGS. 2A, 2B and 3A, 3B. FIGS. 2A, 3A, and 3B illustrate a FSK modulation graph that is a waveform graph having two peaks centered on the center frequency. In FIGS. 2A, 3A, and 3B, a horizontal axis indicates the frequency and a vertical axis indicates the output intensity. A difference ($\Delta f1$ in FIG. 2A and $\Delta f1$ or $\Delta f2$ in FIGS. 3A and 3B) between the high-output-intensity frequency (frequency corresponding to the peak on the right of the center frequency) that is higher than the center frequency and the high-output-intensity frequency (frequency corresponding to the peak on the left of the center frequency) that is lower than the center frequency, namely a frequency difference in the peak output intensity is the maximum frequency shift.

FIG. 2A illustrates a wireless signal in the FSK modulation system having the center frequency f0 and the maximum frequency shift $\Delta f1$. The wireless signal of FIG. 2A is illustrated by the waveform in which the signal of FIG. 2B having the peak frequency fa and the signal of FIG. 2B having the peak frequency fb are combined.

In the communication of the FSK modulation system, when one piece of information is transmitted from the transmission side, the signal having the peak frequency fa and the signal having the peak frequency fb are transmitted at different times as illustrated in FIG. 2B. The reception side determines that the signal having the frequency fa is "0" of the digital signal when receiving the signal having the frequency fa, and the reception side determines that the signal having the frequency fb is "1" of the digital signal when receiving the signal having the frequency fb. That is, the transmission side transmits the signal in which the plural signals having the frequency fa and the plural signals having the frequency fb are combined as a wireless analog signal. The reception side converts the signal having the frequency fa and the signal having the frequency fb into "0" and "1", and processes the digital signals of "0" and "1" as digital information. Therefore, the information is transmitted from the transmission side to the reception side.

FIG. 3A illustrates a conventional transmitting method, and FIG. 3B illustrates a transmitting method of the first embodiment. The conventional transmitting method is identical to the transmitting method of the first embodiment in that the identical transmitting content is output plural times. FIGS. 3A and 3B illustrate the two-time output. In the conventional transmitting method, the maximum frequency shift of the first transmission and the maximum frequency shift of the second transmission are equal to $\Delta f1$. The center frequency of the first transmission and the center frequency of the second transmission are equal to each other. At this point, when a frequency domain of a noise overlaps any one of frequencies of peak output intensity, because the first transmission is identical to the second transmission in the frequency at the peak output intensity, the communication cannot be conducted due to the noise in both the first transmission and the second transmission.

On the other hand, in the transmitting method of the first embodiment, although the center frequency of the first transmission is equal to the center frequency of the second transmission, the maximum frequency shift $\Delta f1$ of the first transmission differs from the maximum frequency shift $\Delta f2$ of the second transmission. Therefore, even if the frequency domain of the noise overlaps any one of the frequencies of the peak output intensity of the first transmission, because the second transmission differs from the first transmission in the frequency at the peak output intensity, there is a high possibility that the second transmission in the frequency at the peak output intensity is out of the frequency domain of the noise. Accordingly, even if the frequency domain of the noise overlaps the frequency of the peak output intensity, because the identical transmitting content is transmitted plural times at different maximum frequency shifts, the frequency of the peak output intensity is out of the frequency domain of the noise in the transmission at any one of the plural times, which allows the communication to be conducted.

In FIG. 3B, the maximum frequency shift $\Delta f2$ of the second transmission is larger than the maximum frequency shift $\Delta f1$ of the first transmission. Alternatively, the maximum frequency shift $\Delta f1$ of the first transmission may be larger than the maximum frequency shift $\Delta f2$ of the second transmission. When the maximum frequency shifts $\Delta f1$ and $\Delta f2$ are excessively increased, a bandwidth is increased. Therefore, for example, a thermal noise is increased in a reception-side filter. On the other hand, when the maximum frequency shifts $\Delta f1$ and $\Delta f2$ are excessively decreased, the communication is hardly conducted as the FSK system. Accordingly, the maximum frequency shifts $\Delta f1$ and $\Delta f2$ are properly selected.

For example, in the transmitting device 1, the center frequency is set to 315 MHz, one of the maximum frequency shifts is set to 40 KHz (+20 KHz and −20 KHz in each side), and the other maximum frequency shift is set to 80 KHz (+40 KHz and −40 KHz in each side). In this case, in the first transmission, the controller 10 outputs the output information including the center frequency of 315 MHz and the maximum frequency shift of 40 KHz in addition to the transmitting content including the command signal. Based on the output information, the generator 20 generates the FSK modulation signal of the transmitting content in which the center frequency is set to 315 MHz while the peak of the output intensity is set to 314.98 MHz (315 MHz−20 KHz) and 315.02 MHz (315 MHz+20 KHz). The transmitting antenna 30 transmits the FSK modulation signal.

In the second transmission, the controller 10 outputs the output information including the center frequency of 315 MHz and the maximum frequency shift of 80 KHz in addition to the transmitting content including the command signal. Based on the output information, the generator 20 generates the FSK modulation signal of the transmitting content in which the center frequency is set to 315 MHz while the peak of the output intensity is set to 314.96 MHz (315 MHz−40 KHz) and 315.04 MHz (315 MHz+40 KHz). The transmitting antenna 30 transmits the FSK modulation signal.

As described above, the maximum frequency shift is slightly changed, the transmission is performed while the center frequency is set to the identical frequency, and the transmitted signal is received to convert the analog signal into the digital signal. Therefore, it is not necessary to introduce a new facility on the receiving device side that performs the processing, and the conventional (existing) receiving device can directly be used in the invention.

Figure 4A:
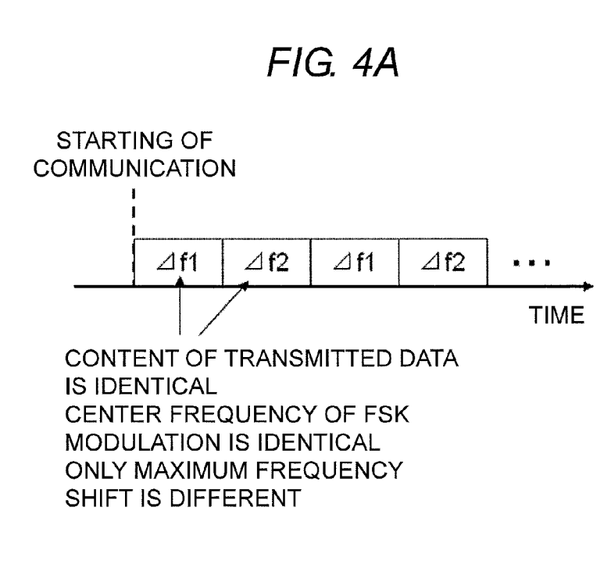
FIGS. 4A and 4B are flowcharts of the transmitting method in the transmitting device of the first embodiment of the present invention.
Figure 4B:
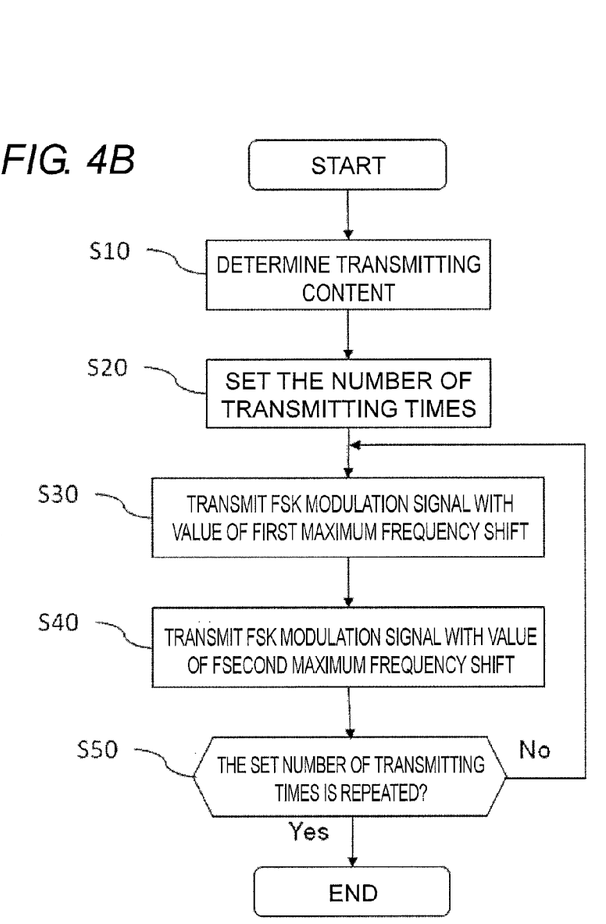

FIGS. 4A and 4B are flowcharts of the transmitting method of the first embodiment of the present invention. Step is abbreviated to S. In the transmitting method of the first embodiment, as illustrated in FIG. 4A, the maximum frequency shift $\Delta f1$ (the value of the first maximum frequency shift) of the first transmission differs from the maximum frequency shift $\Delta f2$ (the value of the second maximum frequency shift) of the second transmission, and the maximum frequency shift $\Delta f1$ and the maximum frequency shift $\Delta f2$ are alternately repeated the predetermined number of times.

In S10, the controller 10 determines the transmitting content based on an operation of the FOB by a user. In S20, the controller 10 sets the number of transmitting times indicating the number of times in which the identical transmitting content is transmitted. The number of transmitting times is previously provided to the controller 10 by an initial setting.

In S30, based on the output information including the first maximum frequency shift $\Delta f1$, which is output from the controller 10, the generator 20 generates the FSK modulation signal, and the transmitting antenna 30 transmits the FSK modulation signal. In S40, based on the output information including the second maximum frequency shift $\Delta f2$, which is output from the controller 10, the generator 20 generates the FSK modulation signal, and the transmitting antenna 30 transmits the FSK modulation signal. In this case, the second transmission is identical to the first transmission in the transmitting content and the center frequency.

In S50, the controller 10 checks whether the number of transmitting times set in S20 is repeated, and the flow returns to S30 when the set number of transmitting times is not repeated. The transmission is ended when the number of transmitting times is repeated.

Figures 5A, 5B:
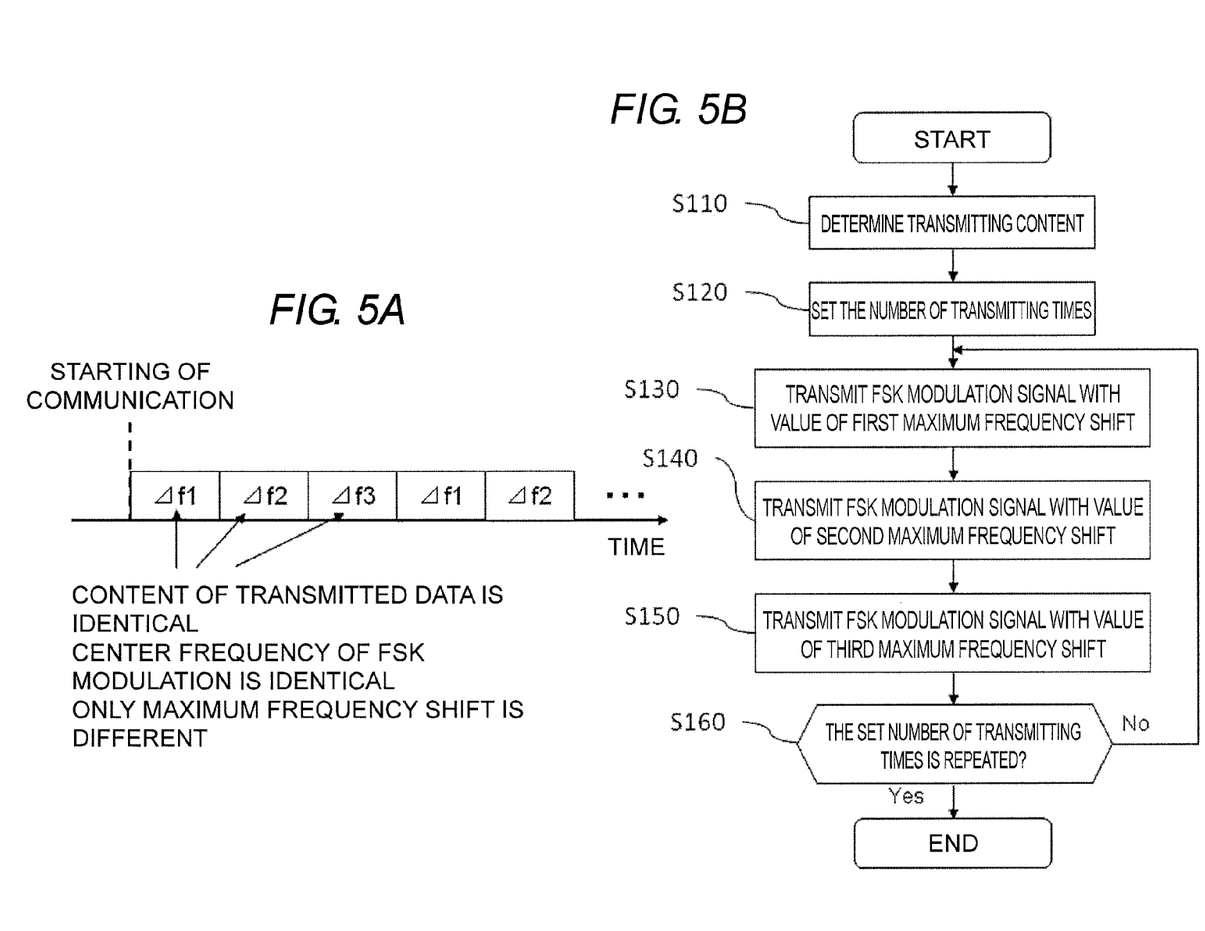
FIGS. 5A and 5B are flowcharts of the transmitting method in the transmitting device according to a first modification of the first embodiment of the present invention.

FIGS. 5A and 5B are flowcharts of the transmitting method in a first modification of the first embodiment. In the first modification, as illustrated in FIG. 5A, the transmission is sequentially repeated the predetermined number of times using three kinds of maximum frequency shifts $\Delta f1$, $\Delta f2$, and $\Delta f3$.

In S110, the controller 10 determines the transmitting content based on the operation of the FOB by the user. In S120, the controller 10 sets the number of transmitting times indicating the number of times in which the identical transmitting content is transmitted. The number of transmitting times is previously provided to the controller 10 by an initial setting.

In S130, based on the output information including the first maximum frequency shift Δf1, which is output from the controller 10, the generator 20 generates the FSK modulation signal, and the transmitting antenna 30 transmits the FSK modulation signal. In S140, based on the output information including the second maximum frequency shift Δf2, which is output from the controller 10, the generator 20 generates the FSK modulation signal, and the transmitting antenna 30 transmits the FSK modulation signal. In this case, the second transmission is identical to the first transmission in the transmitting content and the center frequency.

In S150, based on the output information including the third maximum frequency shift Δf3, which is output from the controller 10, the generator 20 generates the FSK modulation signal, and the transmitting antenna 30 transmits the FSK modulation signal. In this case, the third transmission is identical to the first transmission and the second transmission in the transmitting content and the center frequency.

In S160, the controller 10 checks whether the number of transmitting times set in S120 is repeated, and the flow returns to S130 when the set number of transmitting times is not repeated. The transmission is ended when the number of transmitting times is repeated.

Figures 6A, 6B:
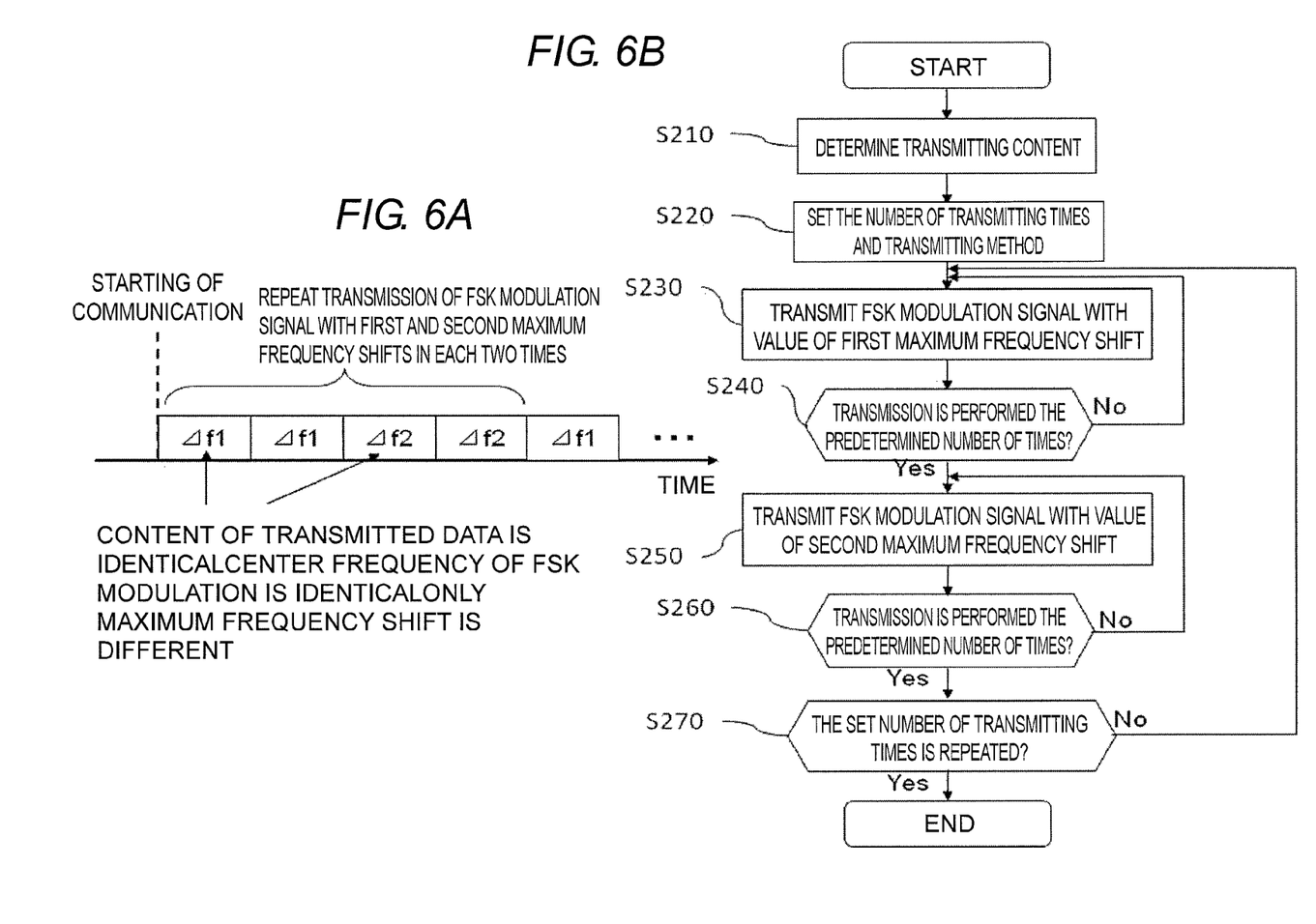
FIGS. 6A and 6B are flowcharts of the transmitting method in the transmitting device according to a second modification of the first embodiment of the present invention.

FIGS. 6A and 6B are flowcharts of the transmitting method in a second modification of the first embodiment. In the second modification, as illustrated in FIG. 6A, using the two kinds of the maximum frequency shifts Δf1 and Δf2, the maximum frequency shift Δf1 is continuously transmitted twice, the maximum frequency shift Δf2 is continuously transmitted twice, and the transmission is repeated the predetermined number of times.

In S210, the controller 10 determines the transmitting content based on the operation of the FOB by the user. In S220, the controller 10 sets the number of transmitting times indicating the number of times in which the identical transmitting content is transmitted and the transmitting method indicating how many times the identical maximum frequency shift is continuously repeated. The number of transmitting times and the transmitting method are previously provided to the controller 10 by the initial setting.

In S230, based on the output information including the first maximum frequency shift Δf1, which is output from the controller 10, the generator 20 generates the FSK modulation signal, and the transmitting antenna 30 transmits the FSK modulation signal. In S240, the controller 10 checks whether the number of transmitting times set in S220 is repeated, and the flow returns to S230 when the set number of transmitting times is not repeated. The flow goes to S250 when the number of transmitting times is repeated.

In S250, based on the output information including the second maximum frequency shift Δf2, which is output from the controller 10, the generator 20 generates the FSK modulation signal, and the transmitting antenna 30 transmits the FSK modulation signal. In this case, the second transmission in S250 is identical to the first transmission in S230 in the transmitting content and the center frequency. In S260, the controller 10 checks whether the number of transmitting times set in S220 is repeated, and the flow returns to S250 when the set number of transmitting times is not repeated. The flow goes to S270 when the number of transmitting times is repeated.

In S270, the controller 10 checks whether the number of transmitting times set in S220 is repeated, and the flow returns to S230 when the set number of transmitting times is not repeated. The transmission is ended when the number of transmitting times is repeated.

Figure 7:
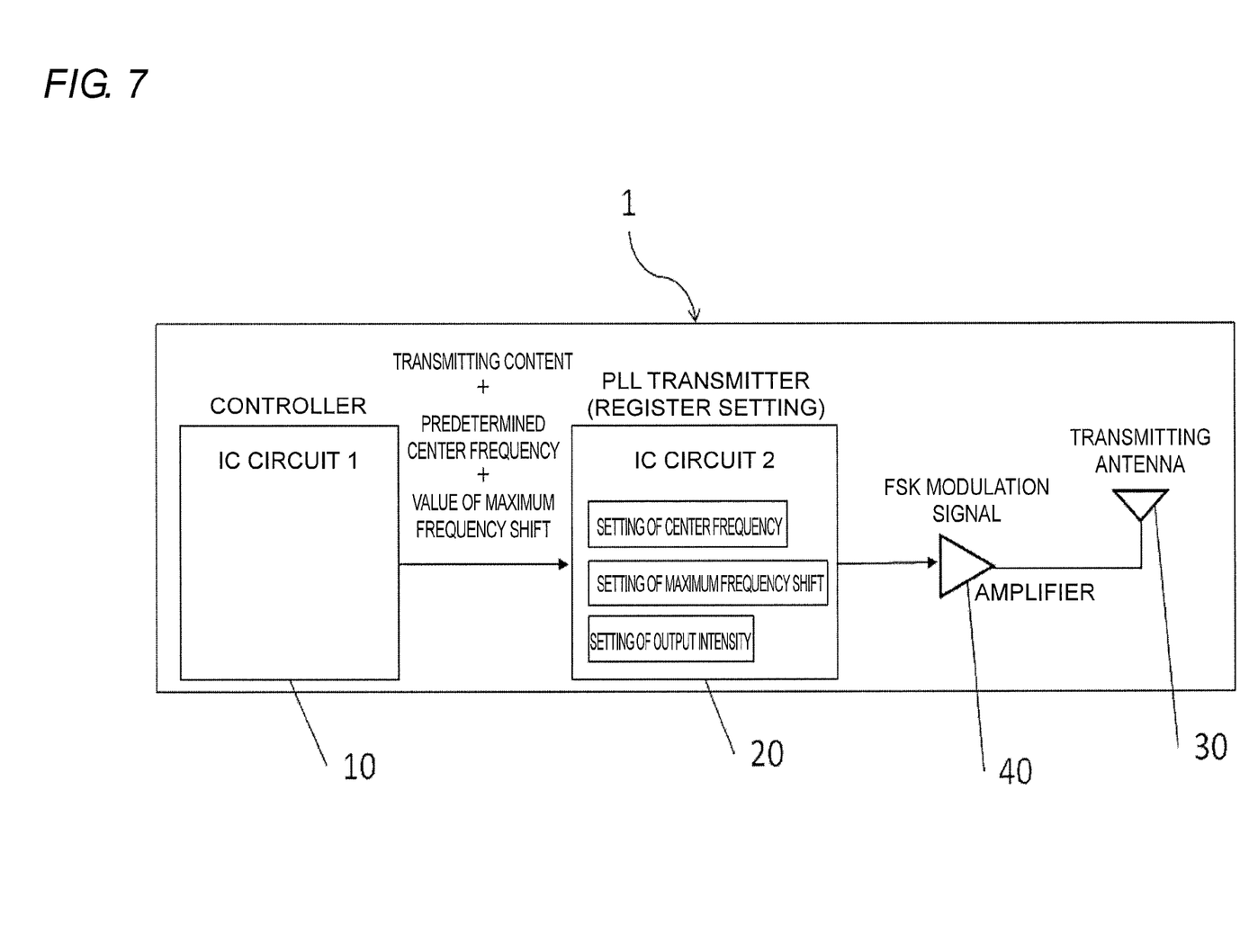
FIG. 7 is a physical configuration diagram illustrating the transmitting device of the first embodiment of the present invention.

FIG. 7 is a physical configuration diagram illustrating the transmitting device of the first embodiment. The controller 10 and the generator 20 of the transmitting device 1 are constructed by IC circuits. The IC circuit of the controller 10 may be a ROM in which control logic is burnt or a RAM in which control logic (program) is loaded along with a microcomputer and an input/output interface. Typically, a PLL (Phase Locked Loop) circuit is used as the IC circuit of the generator 20. In the PLL circuit, the transmission frequency is kept constant, and the signal can be output at a target frequency by setting a value to a register.

An amplifier 40 converts the input signal that is the FSK modulation signal into the output signal having the large power. There is no particular limitation to the amplifier 40 as long as the amplifier 40 exerts the above function. The transmitting antenna 30 transmits the FSK modulation signal, which is generated by the generator 20, in the form of the wireless signal. Generally the coil antenna is used as the transmitting antenna. However, there is no particular limitation to the transmitting antenna.

Second Embodiment

Figure 8:
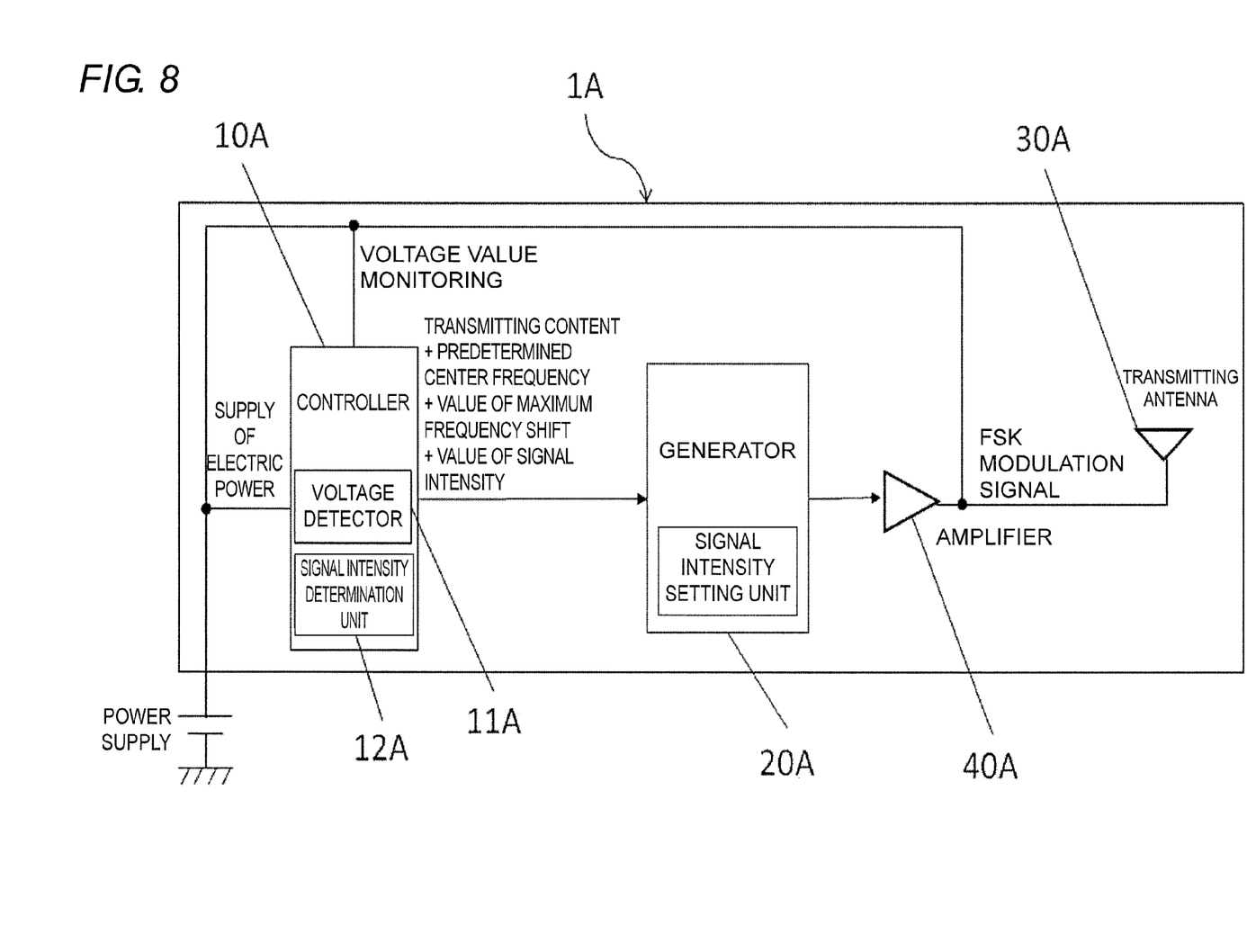
FIG. 8 is a block diagram illustrating a transmitting device according to a second embodiment of the present invention.

FIG. 8 is a block diagram illustrating a transmitting device 1A according to a second embodiment of the present invention. The transmitting device 1A conducts wireless communication with the vehicle-side receiving device (not illustrated) in the keyless entry system of a vehicle, and typically the transmitting device 1A is included in a fob key (FOB).

The transmitting device 1A includes a controller 10A, a generator 20A, the transmitting antenna 30, and an amplifier 40A. The controller 10A determines the transmitting content transmitted to the vehicle-side receiving device and the value of the maximum frequency shift in the FSK modulation. As used herein, the transmitting content includes information necessary to authenticate the FOB and a command signal such as lock/unlock which is provided from the FOB to the vehicle-side receiving device. The information necessary to authenticate the FOB is previously set in each FOB, and the command signal is determined by the user every time the FOB is used.

The controller 10A includes a voltage detector 11A and a signal intensity determination unit 12A. The voltage detector 11A detects a voltage supplied from a power supply to the transmitting device 1A. More specifically, the power supply is a battery incorporated in the FOB. The signal intensity determination unit 12A determines the signal intensity of the FSK modulation signal based on the value of the supply voltage detected by the voltage detector 11A. How to determine the signal intensity of the FSK modulation signal will be described later.

The controller 10A outputs output information including the determined transmitting content, the determined value of the maximum frequency shift, the value of the center frequency of the FSK modulation, and the signal intensity of the FSK modulation signal. Therefore, the transmitting device 1A transmits identical transmitting content plural times using the FSK modulation signal including the identical center frequency and two or more different maximum frequency shifts, when the identical transmitting content is transmitted to the vehicle-side receiving device.

The generator 20A generates the FSK modulation signal based on the transmitting content, the value of the maximum frequency shift, the value of the center frequency, and the signal intensity of the FSK modulation signal, which are output from the controller 10A. At this point, the generator 20A sets the value of the signal intensity of the FSK modulation signal to the amplifier 40A, and the transmitting antenna 30A transmits the FSK modulation signal in the form of the wireless signal at the signal intensity set to the amplifier 40A. How to change the value of the maximum frequency shift may be identical to that of the first embodiment.

Figure 9A:
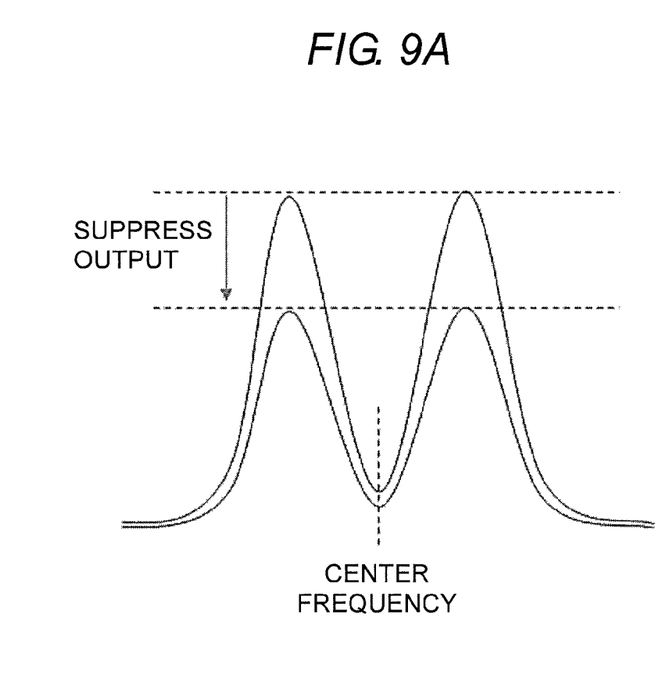
FIGS. 9A and 9B are explanatory views of a transmitting method in the transmitting device of the second embodiment of the present invention.
Figure 9B:
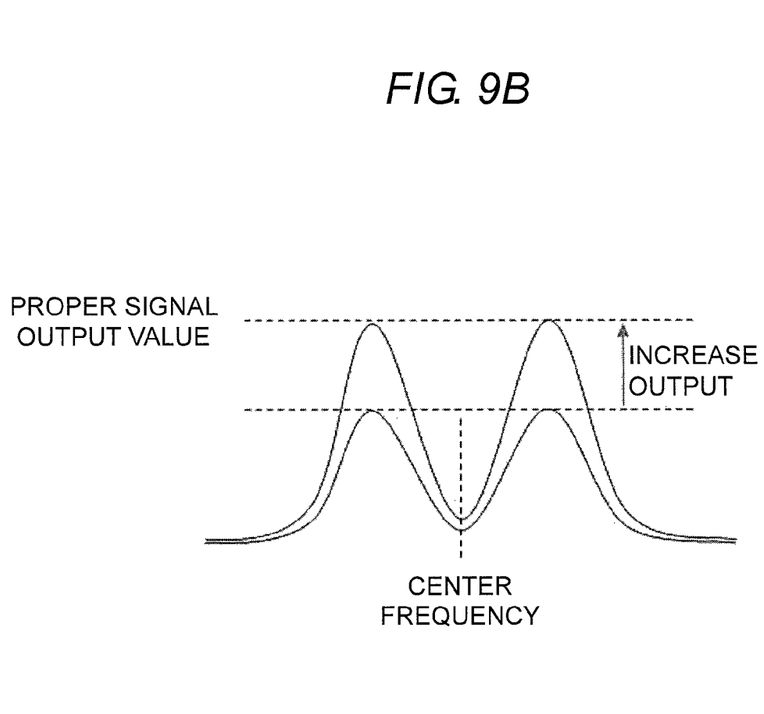

How to change the signal intensity of the FSK modulation signal will be described with reference to FIGS. 9A and 9B. FIGS. 9A and 9B illustrate a FSK modulation graph that is a waveform graph having two peaks centered on the center frequency. In FIGS. 9A and 9B, the horizontal axis indicates the frequency and the vertical axis indicates the output intensity. FIG. 9A illustrates the case in which the new power supply has the high power supply voltage, and FIG. 9B illustrates the case in which the old power supply has the low power supply voltage.

In the case of FIG. 9A, when the wireless signal is generated by directly using the power supply voltage, the signal intensity of the wireless signal is higher than a proper value. In this case, because the voltage detector 11A detects that the voltage supplied from the power supply to the transmitting device 1A is higher than the previously-provided proper value, and the signal intensity determination unit 12A determines the signal intensity such that the signal intensity is suppressed to come close to the proper signal intensity. Therefore, power saving can be achieved.

In the case of FIG. 9B, when the wireless signal is generated by directly using the power supply voltage, the signal intensity of the wireless signal is lower than the proper value. In this case, because the voltage detector 11A detects that the voltage supplied from the power supply to the transmitting device 1A is lower than the previously-provided proper value, and the signal intensity determination unit 12A determines the signal intensity such that the signal intensity is enhanced to come close to the proper signal intensity. Therefore, stabilization of communication quality is achieved.

The present invention is not limited to the above embodiments, but various changes can be made. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A transmitting device that transmits a FSK-modulated wireless signal to a receiving device, comprising:
   a controller that determines a transmitting content transmitted to the receiving device and a value of a maximum frequency shift in the FSK modulation, and outputs output information including the transmitting content, the value of the maximum frequency shift, and a value of a center frequency in the FSK modulation;
   a generator that generates a FSK modulation signal based on the transmitting content, the value of the maximum frequency shift, and the value of the center frequency, which are output from the controller; and
   a transmitting antenna that transmits the FSK modulation signal, which is generated by the generator, in a form of a wireless signal,
   wherein when the identical transmitting content is transmitted to the receiving device a plurality of times, the controller determines the identical transmitting content, the identical value of the center frequency, and different values of the maximum frequency shifts for the transmissions of the plurality of times, and outputs a plurality of pieces of information which include the identical transmitting content, the identical values of the center frequency, and the different values of the maximum frequency shifts at different times, and
   wherein the transmitting antenna transmits the FSK modulation signals a plurality of times, in the form of the wireless signals, with the identical value of the center frequency and different values of the maximum frequency shifts.

2. The transmitting device according to claim 1, wherein the controller outputs the output information including the maximum frequency shifts having the alternately-different values, when the identical transmitting content is transmitted to the receiving device.

3. The transmitting device according to claim 2, further comprising an amplifier,
   wherein the controller includes:
   a voltage detector that detects a supply voltage of a power supply; and
   a signal intensity determination unit that determines signal intensity of the FSK modulation signal based on a value of the supply voltage detected by the voltage detector,
   wherein the controller outputs the output information further including the value of the signal intensity determined by the signal intensity determination unit, the generator sets the value of the signal intensity to the amplifier, and the transmitting antenna transmits the FSK modulation signal in the form of the wireless signal at the signal intensity set to the amplifier.

4. The transmitting device according to claim 1, further comprising an amplifier,
   wherein the controller includes:
   a voltage detector that detects a supply voltage of a power supply; and
   a signal intensity determination unit that determines signal intensity of the FSK modulation signal based on a value of the supply voltage detected by the voltage detector,
   wherein the controller outputs the output information further including the value of the signal intensity determined by the signal intensity determination unit, the generator sets the value of the signal intensity to the amplifier, and the transmitting antenna transmits the FSK modulation signal in the form of the wireless signal at the signal intensity set to the amplifier.

5. A transmitting method for transmitting a transmitting content in a form of a FSK-modulated wireless signal to a receiving device at least twice, comprising:
   performing predetermined FSK modulation on the transmitting content to transmit the transmitting content based on a value of a center frequency in the FSK modulation and a value of one of maximum frequency shifts;
   performing the predetermined FSK modulation on the transmitting content to transmit the transmitting content based on the value of the center frequency in the FSK modulation and a value of the other maximum frequency shift;
   determining, when the identical transmitting content is transmitted to the receiving device a plurality of times, the identical transmitting content, the identical value of the center frequency, and different values of the maximum frequency shifts for the transmissions of the plurality of times,
   outputting a plurality of pieces of information which include identical transmitting content, identical values of the center frequency, and the different values of maximum frequency shifts at different times; and transmitting the FSK modulation signals a plurality of times, in the form of wireless signals, with the identical value of the center frequency and different values of the maximum frequency shifts.

\* \* \* \* \*